US012766877B2

(12) United States Patent
Morris

(10) Patent No.: US 12,766,877 B2
(45) Date of Patent: Oct. 20, 2026

(54) SYSTEM AND METHOD FOR CONVERTING MOBILE HOME AXLE ASSEMBLIES

(71) Applicant: Stoney Morris, Bay Minette, AL (US)

(72) Inventor: Stoney Morris, Bay Minette, AL (US)

( * ) Notice: Subject to any disclaimer, the term of this patent is extended or adjusted under 35 U.S.C. 154(b) by 579 days.

(21) Appl. No.: 17/873,431

(22) Filed: Jul. 26, 2022

(65) Prior Publication Data

US 2024/0034092 A1 Feb. 1, 2024

(51) Int. Cl.
*B60B 3/16* (2006.01)
*B60B 3/08* (2006.01)
*B60B 3/14* (2006.01)

(52) U.S. Cl.
CPC .................. *B60B 3/16* (2013.01); *B60B 3/08* (2013.01); *B60B 3/147* (2013.01); *B60Y 2200/147* (2013.01)

(58) Field of Classification Search
CPC ........... B60B 3/147; B60B 3/16; B60B 27/06; B60B 27/065
See application file for complete search history.

(56) References Cited

U.S. PATENT DOCUMENTS 4,337,003 A * 6/1982 Juhl ........................ B60B 37/10 301/128
6,065,893 A * 5/2000 Montanez, Jr. ........... B60B 3/16 403/1
9,649,879 B2 * 5/2017 Randall ............... G01M 17/013
11,332,005 B2 * 5/2022 Aknin ...................... B60B 35/14
11,724,540 B2 * 8/2023 Lucà ...................... B60B 29/001 29/894.32
2002/0190570 A1 * 12/2002 Gorges ................ B60B 35/1081 301/35.629

* cited by examiner

*Primary Examiner* — Jason R Bellinger
(74) *Attorney, Agent, or Firm* — AdamsIP, LLC

(57) ABSTRACT

A system and method for altering mobile home axle assemblies to support closed disc wheels instead of open disc wheels is provided. Generally, the system and method are designed to reduce the cost of transporting mobile homes while increasing safety by changing the wheels supported by mobile home axles from limited use mobile home wheels to highway rated, closed disc wheels that may be used multiple times. The system includes a convertor hub configured to secure to a mobile home axle assembly and a convertor plate configured to secure to the converter hub. The convertor hub is designed to replace the standard axle hub of the mobile home axle assembly and work with existing parts of the mobile home axle assembly whereas the converter plate allows for the attachment of a closed disc wheel.

20 Claims, 7 Drawing Sheets

SYSTEM AND METHOD FOR CONVERTING MOBILE HOME AXLE ASSEMBLIES

FIELD OF THE DISCLOSURE

The subject matter of the present disclosure refers generally to a system and method for altering mobile home axles to support closed disc wheels.

BACKGROUND

Mobile home axles are inexpensive, strong, and often come with brakes. This makes them particularly useful for not only mobile homes but also for flatbed trailers and other vehicles designed for transporting materials. However, mobile home axles are often not designed for long-term use, meaning they are not designed with service in mind. Additionally, because they are designed specifically for use with mobile homes, replacement parts can sometimes be difficult to find since a mobile home generally travels very short distances and only a few times during said mobile home's lifetime at most. This limited lifetime extends to mobile home tires as well. In fact, it's illegal to use mobile home tires on any vehicle that is not a mobile home, and most mobile home tires are stamped to say that they are rated for "mobile home use only." Nonetheless, not all states ban the use of mobile home axles.

Much of the concern resulting in the restriction of mobile home tires that doesn't extend to the mobile home axles themselves has to do with how mobile home tires are secured to the hubs of the mobile home axles. If not secured properly, the wheel of the mobile home tire can spin on the clamps securing the mobile home tires to the hub of the mobile home axle, causing the clamps to loosen until the mobile home tire falls off of the hub. This can be particularly dangerous when a tire flies off of the hub while driving down the road. Further, mobile home tires are considered one time use tires and typically do not handle normal interstate speeds due to the heat buildup, resulting in blowouts if used at higher speeds over longer periods of time.

As such, mobile home axles have limited use cases due to the illegality of the mobile home tire. On the other hand, this limited use case hasn't resulted in the disposal of mobile home axles. There are entire industries designed around buying used mobile home axles, refurbishing said axles, and selling the refurbished mobile home axles to mobile home manufacturers for use in new mobile homes. Mobile home axles are also a popular choice of those who build homemade flatbed trailers due the aforementioned durability and cost effectiveness of said axles. However, these homemade trailers are not necessarily road legal if they have not been modified to use a different type of tire than mobile home tires for which the axle was designed. There are conversion kits that allow one to replace the entire hub assembly; however, replacement of the entire hub assembly requires specialized equipment, labor hours, and a much greater cost.

Accordingly, there is a need in the art for system that alters a mobile home axle in a way such that allows for one to attach closed disc wheels thereto without the requirement of replacing the entire hub assembly.

SUMMARY

A system and method for altering mobile home axle assemblies to support closed disc wheels instead of open disc wheels is provided. In one aspect, the system allows one to modify mobile home axle assemblies to support tires that are highway legal. In another aspect, the system allows one to use mobile home axle assemblies for vehicles other than mobile homes by changing the wheel type for which the mobile home axle assembly is designed to support. Generally, the system and method of the present disclosure are designed to reduce the cost of transporting mobile homes while increasing safety by changing the tire supported by mobile home axle assemblies from limited use mobile home tires to that of multi-use tires that are also highway rated by the Department of Transportation. Additionally, the system is designed to limit the cost of altering existing mobile home axle assemblies to support closed disc wheels by only requiring the replacement of the hub instead of the entire hub assembly.

In a preferred embodiment, the system comprises a convertor hub and a convertor plate that secures to said converter hub, wherein said convertor hub is configured to secure to a mobile home axle assembly. The convertor hub is designed to replace the standard axle hub of the mobile home axle assembly and work with existing parts of the mobile home axle assembly. The convertor plate is configured to seat against a top surface of said convertor hub, wherein a plurality of apertures of a base disc of said convertor plate are configured to align with a plurality of cavities of said convertor hub. The cavities are configured to accept an attachment element that secures said convertor plate to said convertor hub. An extension disc having a plurality of attachment lugs and secured to a top surface of said base disc allows for the attachment of closed disc wheels thereto. The system may comprise more than one convertor hub, wherein each convertor hub comprises a lug pattern configured to support closed disc wheels having the same lug pattern.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For instance, an axle hub conversion device "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
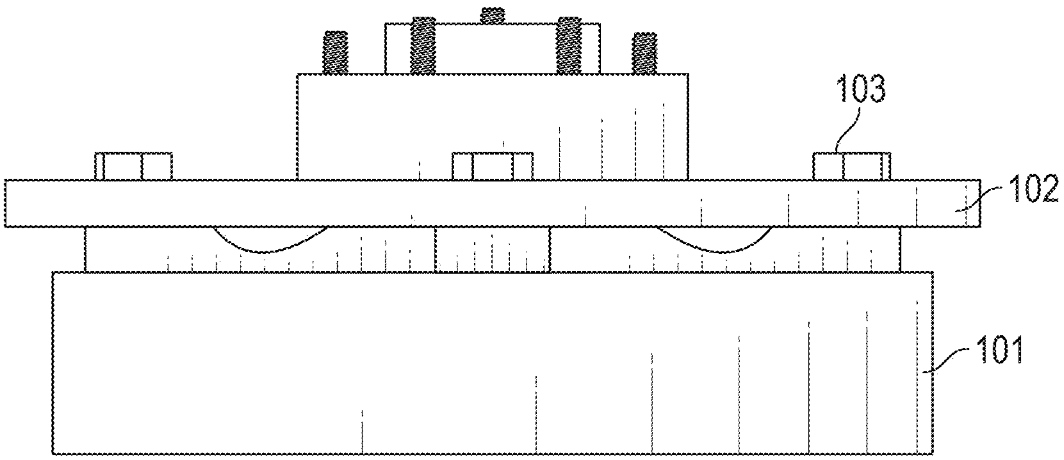
FIG. 1 is a diagram illustrating a converter device embodying features consistent with the principles of the present disclosure.
Figure 2:
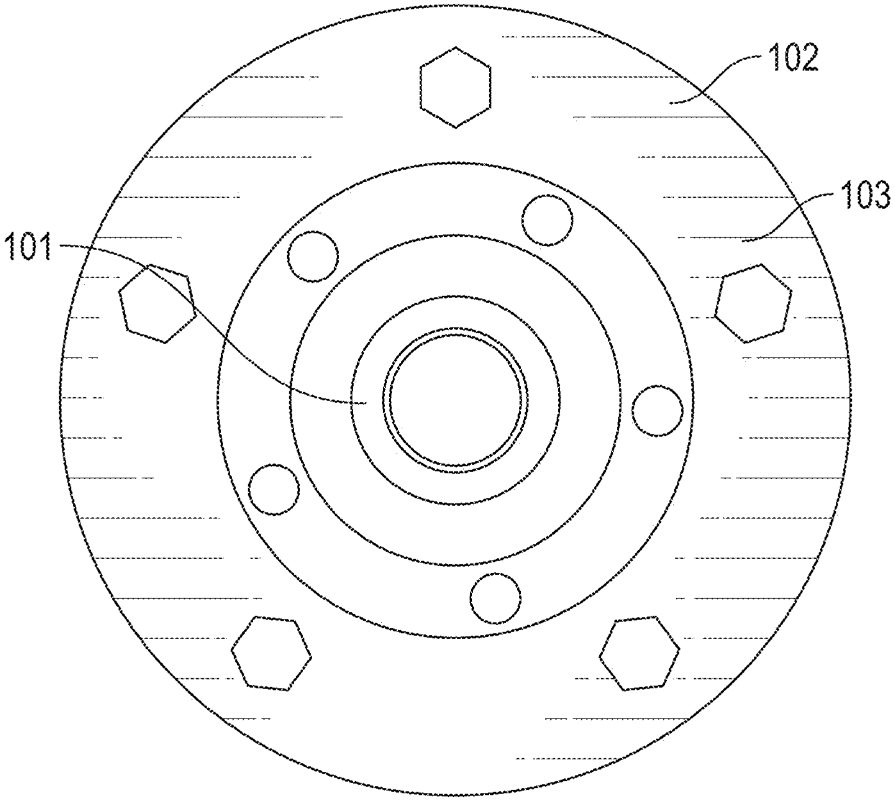
FIG. 2 is a diagram illustrating a converter device embodying features consistent with the principles of the present disclosure.
Figure 3:
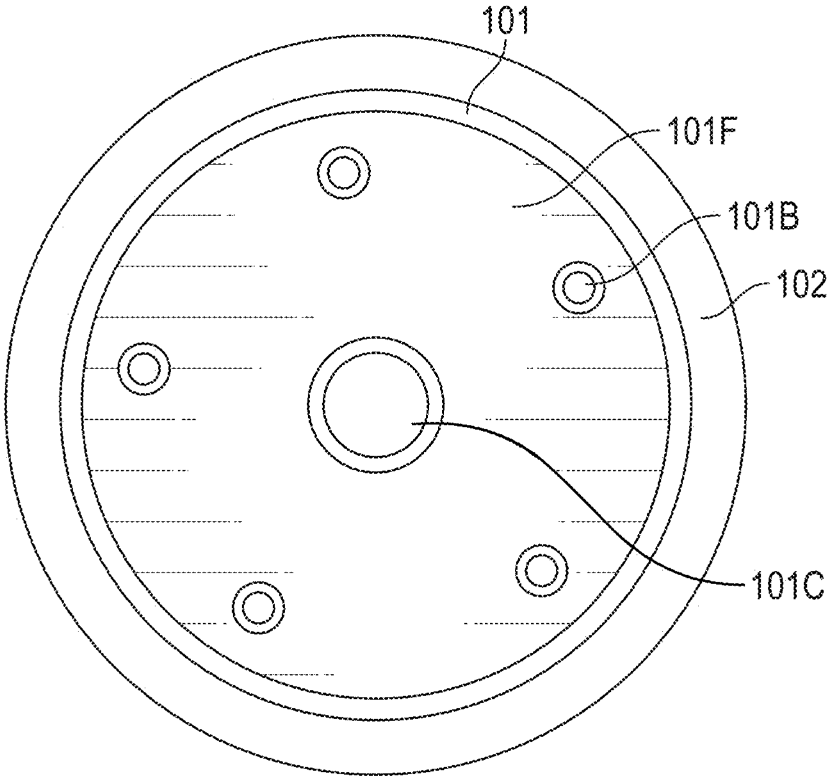
FIG. 3 is a diagram illustrating a converter device embodying features consistent with the principles of the present disclosure.
Figure 4:
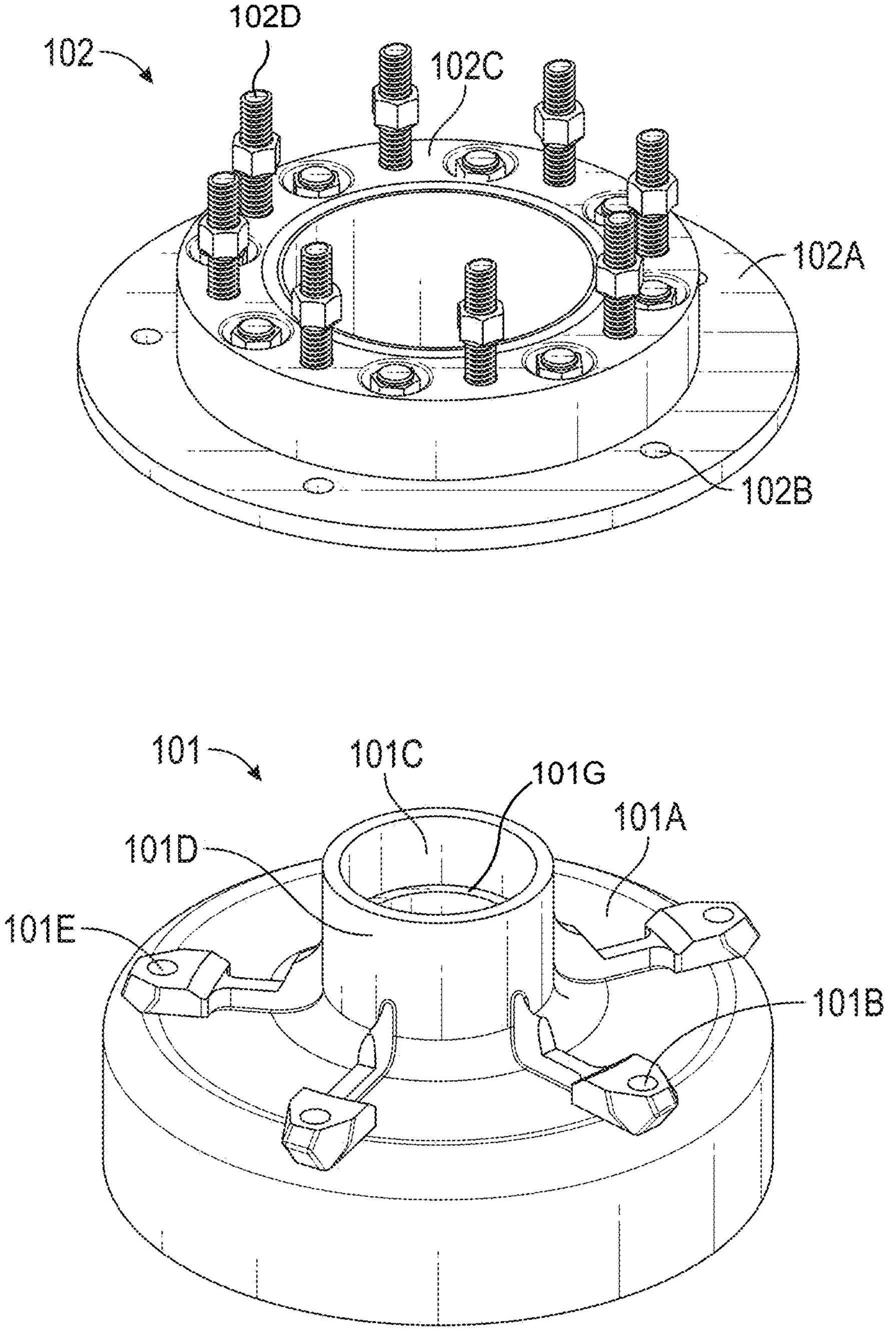
FIG. 4 is a diagram illustrating an exploded view of a converter device embodying features consistent with the principles of the present disclosure.
Figure 5:
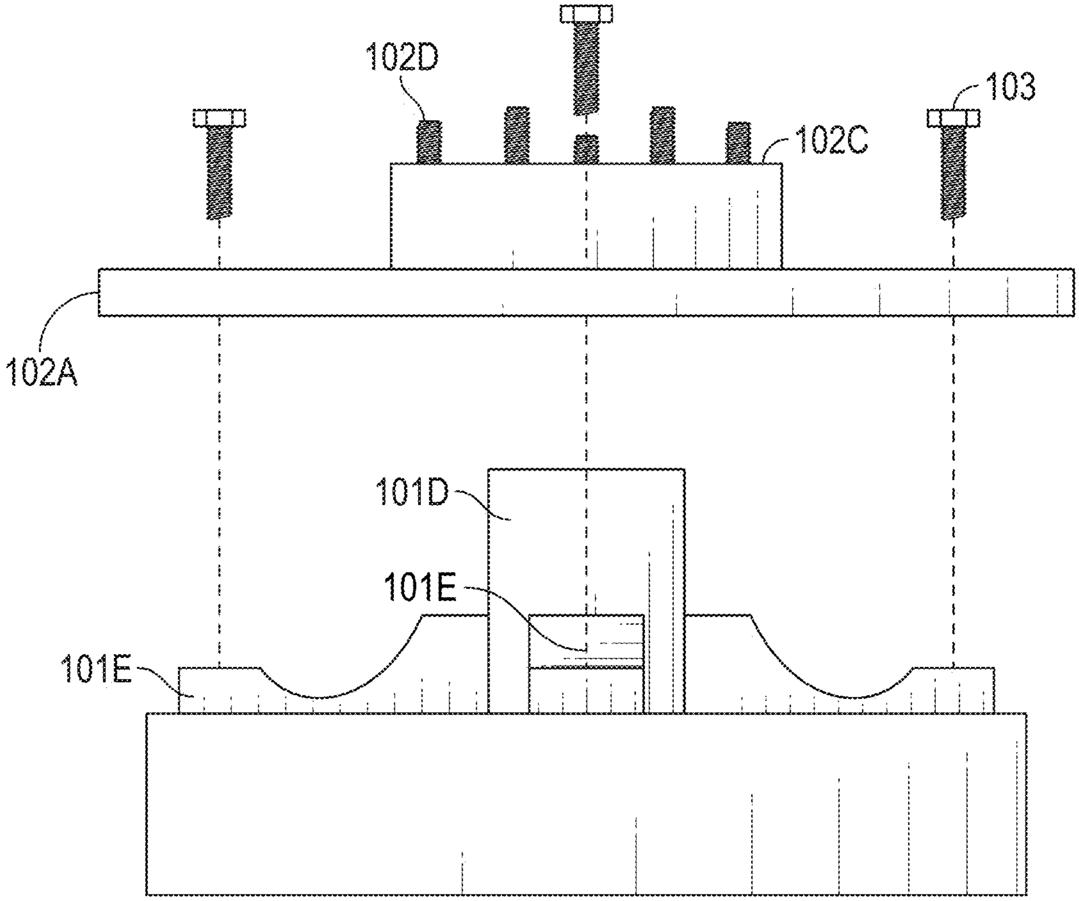
FIG. 5 is a diagram illustrating an exploded view of a converter device embodying features consistent with the principles of the present disclosure.
Figure 6:
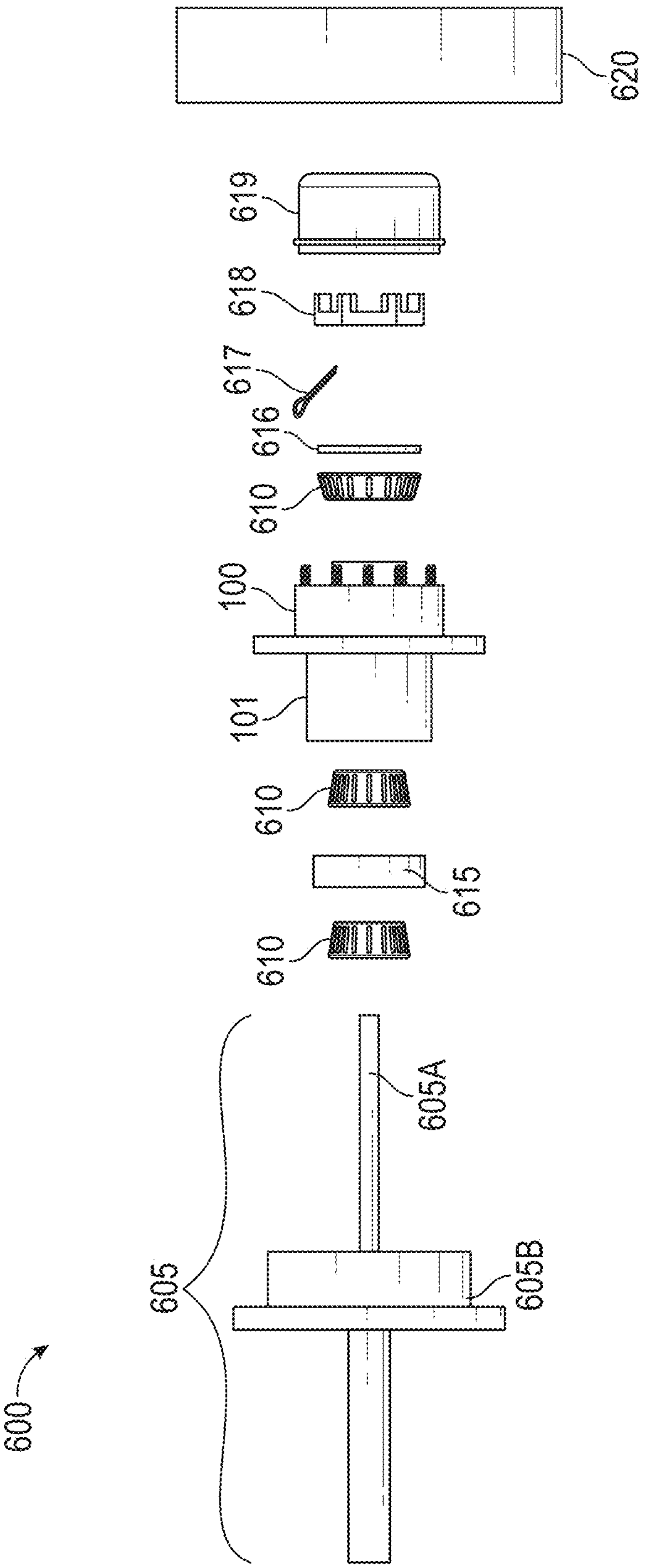
FIG. 6 is a diagram illustrating an exploded view of a system embodying features consistent with the principles of the present disclosure.
Figure 7:
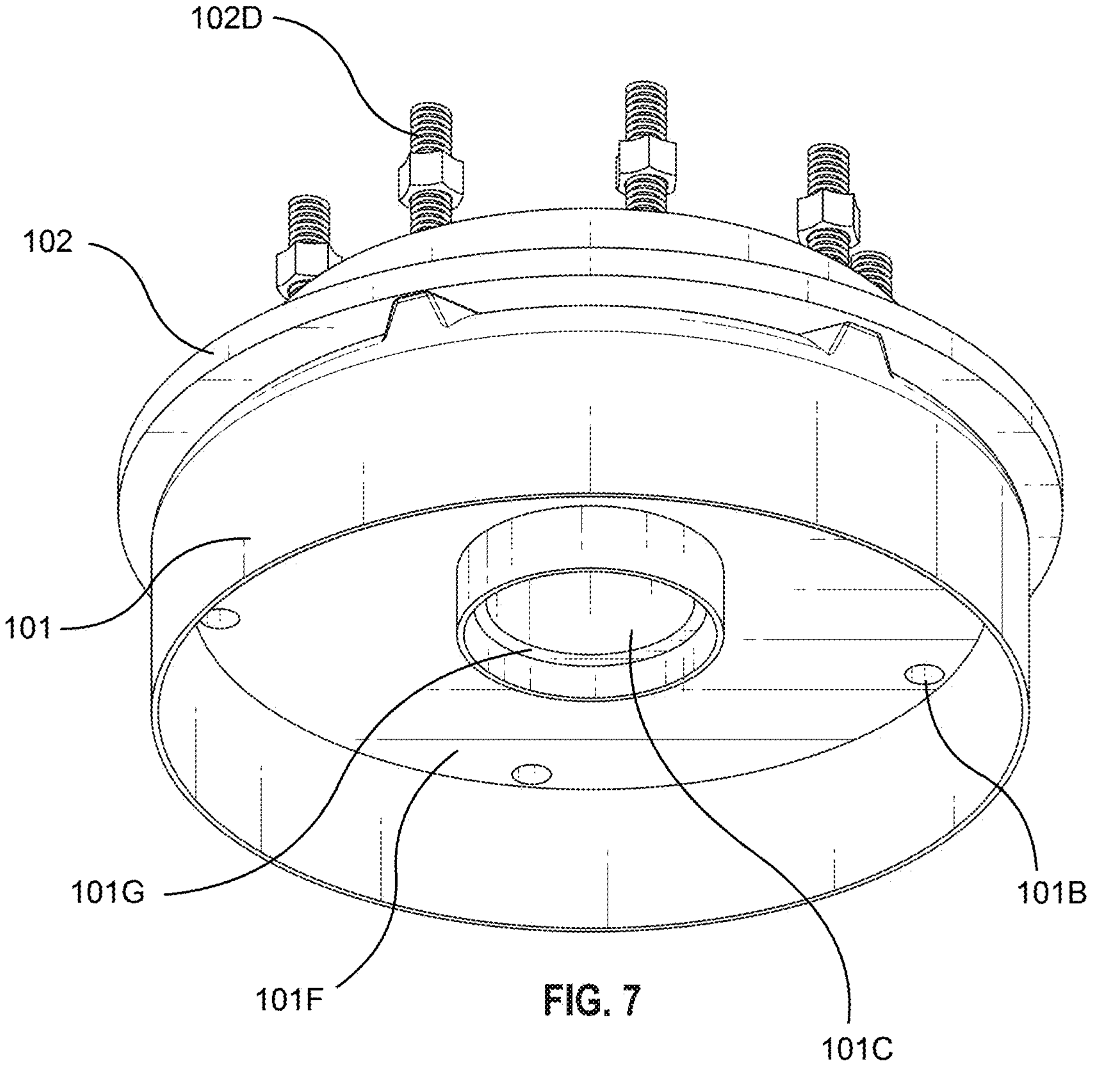
FIG. 7 is a diagram illustrating a converter device embodying features consistent with the principles of the present disclosure.
Figure 8:
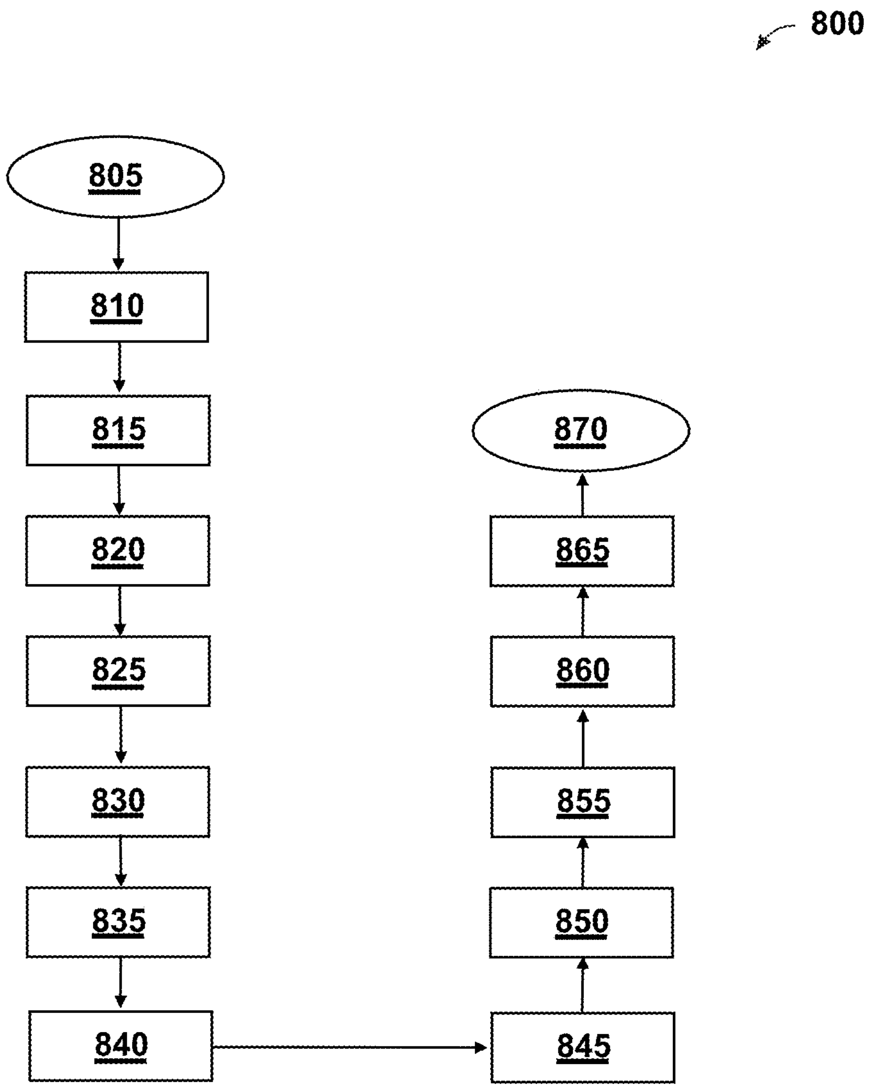
FIG. 8 is a flow chart illustrating certain method steps of a method embodying features consistent with the principles of the present disclosure.

As will be evident from the disclosure provided, the present invention satisfies the need for a system 600 and method for altering mobile home axle assemblies 605 to support closed disc wheels 620 instead of open disc wheels. FIGS. 1-8 illustrate embodiments of a converter device 100 and mobile home axle assembly 605 as well as a method for attaching the converter device 100 to the mobile home axle assembly 605. FIG. 1 illustrates a front view of a converter device 100 comprising a converter hub 101 and a converter plate 102, wherein said converter device 100 is used to alter mobile home axle assemblies to support closed disc wheels 620. FIG. 2 illustrates a top view of a converter device 100 used to alter mobile home axle assemblies to support closed disc wheels 620, wherein a central projection 101D of the converter hub 101 extends through a projection hole of the converter plate 102. FIG. 3 illustrates a bottom view of a converter device 100 used to alter mobile home axle assemblies, wherein the central bore 101C can be seen extending from the inner drum 101F to the outer surface 101A. FIG. 4 illustrates a converter device 100 comprising a converter hub 101 and a converter plate 102 unattached from one another. FIG. 5 illustrates a side exploded view of a converter device 100 used to alter mobile home axle assemblies 605 to support closed disc wheels 620. FIG. 6 illustrates an exploded view of a system 600 comprising a converter device 100 being installed onto and mobile home axle assembly 605. FIG. 7 illustrates a bottom perspective view of a converter device 100 used to alter mobile home axle assemblies. FIG. 8 illustrates a method for installing a converter device 100 onto a mobile home axle assembly 605. It is understood that the various method steps associated with the methods of the present disclosure may be carried out by a user using the components of the system 600 shown in FIG. 6.

The system 600 generally comprises a converter device 100 having a converter hub 101, converter plate 102, and plurality of attachment elements 103, wherein said convertor hub is configured to secure to a mobile home axle assembly 605, which is illustrated in FIG. 6 (the spindle 605A, axle hub assembly 605B, inner bearing 610, outer bearing 610, seal 615, axle hub, spindle washer 616, spindle nut retainer 617, spindle nut 618, and dust cap 619 depicted in FIG. 6 are not necessarily drawn to scale relative to one another). In a preferred embodiment, the system 600 comprises a mobile home axle assembly 605 to which the converter device 100 secures to. The convertor hub is designed to replace the axle hub of the mobile home axle assembly 605 and work with existing parts of the hub assembly 605B of the mobile home axle assembly 605. In yet another preferred embodiment, the system 600 may further comprise a closed disc wheel 620 configured to secure to the converter plate 102. A lug pattern of the converter plate 102 is configured to match the lug pattern of the closed disc wheel 620, allowing the closed disc wheel 620 to be secured thereto. The system 600 preferably comprises more than one convertor hub operably connected to the mobile home axle assemblies 605 of a vehicle, wherein each convertor hub comprises said lug pattern configured to support a closed disc wheel 620 having a similar lug pattern.

In a preferred embodiment, the mobile home axle assembly 605 comprises an axle, spindle 605A, axle hub assembly 605B, inner bearing 610, outer bearing 610, seal 615, axle hub, spindle washer 616, spindle nut retainer 617, spindle nut 618, and dust cap 619, as illustrated in FIG. 6. The spindle washer 616 protects the outer bearing 610 from the edges and points of the spindle nut 618. Spindle nut retainer 617 secures the spindle nut 618 to the spindle 605A, which in turn secures the converter hub 101 to the mobile home axle assembly 605. The spindle nut 618 operably connects the spindle 605A to the hub of the closed disc wheel 620. Types of spindle nuts 618 that may be used include, but are not limited to, a standard nut, a stamped nut, a castle nut, and a double nut. Dust caps 619 are small, round, covers (preferably metal) that protect the mobile home axle assembly from dirt, dust, sand, water, salt and road grime that can destroy the inner/outer bearings 610. Because bearings 610 require constant lubrication to remain effective, bearing grease is packed all around the inner/outer bearings 610 every time they're replaced/removed from the axle hub. Dust caps 619 protect the bearing grease from contamination and hold the grease that surrounds the inner/outer bearings 610 in place.

The inner bearing 610 and outer bearing 610 are configured to fit within a central bore 101C of the axle hub. A tight fitting seal 615 (configured to hold the inner bearing 610 in place within the central bore 101C of the axle hub at the drum end) may also be fitted within the bore at the drum end to help hold the inner bearing within said central bore whereas a spindle washer 616, spindle nut retainer 617, and spindle nut 618 may be used at the central projection end to help hold the outer bearing in place within the central bore. In a preferred embodiment, the inner bearing 610 and outer bearing 610 are packed with bearing grease prior to being positioned within the central bore 101C. An inner race 101G and outer race 101G of the central bore 101C provide surfaces on which the bearings 610 may freely rotate, wherein the bearing grease reduces friction experienced by the bearings 610 as they rotate. In a preferred embodiment, the central bore 101C of the axle hub and the central bore 101C of the converter hub 101 are similar in size and shape such that the bearings 610 of the axle hub also fit within the central bore 101C of the converter hub 101. Materials that may be used to construct the axle include, but are not limited to, wood, aluminum, steel, plastic, or any combination thereof.

In a preferred embodiment, the converter hub 101 comprises an inner drum 101F, outer surface 101A, central bore 101C, and plurality of converter bores 101B. The central bore 101C preferably extends from said outer surface 101A and into said inner drum 101F via a central projection 101D that extends away from said inner drum 101F. Additionally, the central bore 101C preferably comprises an inner race 101G and an outer race 101G similar to those of the axle hub, providing a surface for the inner bearing(s) 610 and outer bearing 610 to sit while positioned within the central bore 101C. Additionally, a similarly sized bore allows for the converter hub 101 to secure to the spindle 605A of the mobile home axle assembly 605. A plurality of raised knuckles 101E of said outer surface 101A are configured to allow for the seating of the converter plate 102 thereon. In a preferred embodiment, a top surface of each raised knuckle of said plurality of raised knuckles 101E is substantially flat, which allows for the converter plate 102 to sit flush against said raised knuckles 101E. The plurality of converter bores 101B preferably extends through said raised knuckles 101E and into said inner drum 101F. The inner drum 101F of the converter hub 101 is configured to cover the axle hub assembly of said mobile home axle assembly 605, including brakes. Materials that may be used to construct the converter hub 101 include, but are not limited to, wood, aluminum, steel, plastic, or any combination thereof.

In a preferred embodiment, the converter plate 102 comprises a base disc 102A, extension disc 102C, projection hole, and plurality of apertures 102B. As mentioned previously, a bottom surface of the base disc 102A is configured to sit flush against said top surface of said plurality of raised knuckles 101E. In a preferred embodiment, the bottom surface of the converter plate 102 is flat. The extension disc 102C is preferably secured to the top surface of the base disc 102A via attachment elements 103; however, some embodiments of the converter plate 102 may comprise a base disc 102A and extension disc 102C that are of one piece. A plurality of lugs 102D of said extension disc 102C are preferably arranged in a lug pattern that matches lug patterns of closed disc wheels 620, which may allow for closed disc wheels 620 to be secured thereon. The projection hole of the converter plate 102 extends centrally through said base disc 102A and said extension disc 102C and is sized to contain the central projection 101D of the converter hub 101 therein. The plurality of apertures 102B of the converter plate 102 are configured to align with said plurality of converter bores 101B of said converter hub 101 so that attachment elements 103 may be used to secure the converter plate 102 to the converter hub 101 which is secured to the mobile home axle assembly 605 by the spindle nut retainer 617 and spindle nut 618. Materials that may be used to construct the converter plate 102 include, but are not limited to, wood, aluminum, steel, plastic, or any combination thereof.

The attachment elements 103 of the converter device 100 are configured to secure the converter plate 102 to the converter hub 101 by extending through said plurality of apertures 102B and said plurality of converter bores 101B in way that prevents the converter plate 102 from disengaging the converter hub 101. Apparatuses that may act as the attachment element include, but are not limited to, push-pull pins, bolts, screws, or any combination thereof. In a preferred embodiment, an internal threaded section within said plurality of converter bores 101B and an external threaded section of said plurality of attachment elements 103 are configured to mate with one another. When a user aligns the plurality of apertures 102B of the converter plate 102 with the plurality of converter bores 101B of said converter hub 101 and then places an attachment element having an external threaded section into a converter bore having an internal threaded section, the user may apply a rotational force to said attachment element to cause the threaded sections to mate and secure the converter plate 102 to the converter hub 101.

FIG. 8 provides a flow chart 800 illustrating certain, preferred method steps that may be used to carry out the method of installing the converter device 100 onto a mobile home axle assembly 605. Step 805 indicates the beginning of the method. During step 810, a user may obtain a mobile home axle assembly 605, converter hub 101 configured to secure to said mobile home axle assembly 605, converter plate 102 configured to secure to said converter hub 101, and a closed disc wheel 620 configured to secure to said converter plate 102. Once the mobile home axle assembly 605, converter hub 101, converter plate 102, and closed disc wheel 620 have been obtained, the user may remove the axle hub from the mobile home axle assembly 605 during step 815, which includes removing the dust cap 619, spindle nut 618, spindle nut retainer 617, spindle washer 616, and outer bearing 610 prior to removing the axle hub. The user may then remove the inner bearing 610 and seal 615 from the central bore 101C of the axle hub during step 820 and subsequently clean the inner bearing 610, outer bearing 610, and seal 615 during step 825. Once cleaned, the user may pack the inner bearing 610 and outer bearing 610 with new grease during step 830 and then install the inner bearing 610 and seal 615 at the drum end within the central bore 101C during step 835.

During step 840, the user may position the converter hub 101 about the spindle 605A of said mobile home axle assembly 605 by placing the central bore 101C of the converter hub 101 onto said spindle 605A. Once the converter hub 101 has been positioned on the spindle 605A, the user may finish securing the converter hub 101 to the mobile home axle assembly 605 by installing the outer bearing 610, spindle washer 616, spindle nut retainer 617, spindle nut 618, and dust cap 619 during step 845. The user may then align the plurality of apertures 102B of the converter plate 102 with the plurality of converter bores 101B of the converter hub 101 during step 850. Using the plurality of attachment elements 103, the user may secure the converter plate 102 to the converter hub 101 during step 855. The user may then align a lug pattern of the closed disc wheel 620 with the plurality of lugs 102D of the converter plate 102 and position the closed disc wheel 620 onto the converter plate 102 during step 860 prior to securing the closed disc wheel 620 to the converter plate 102 using a plurality of lug nuts during step 865. The user may then proceed to the terminate method step 870.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and process stages which have been described and illustrated in order to explain the nature of this inventive subject matter can be made without departing from the principles and scope of the inventive subject matter.

What is claimed is:

1. A system for altering a mobile home axle assembly to support closed disc wheels comprising, a converter hub having an inner drum, outer surface, central bore, and plurality of converter bores, wherein said central bore extends from said outer surface to said inner drum through a central projection of said outer surface, wherein said plurality of converter bores extend from said outer surface to said inner drum through a plurality of raised knuckles of said outer surface, wherein each raised knuckle of said plurality of raised knuckles has a substantially planar top surface, and a converter plate having a base disc, extension disc, projection hole, and plurality of apertures, wherein said plurality of apertures of said converter plate align with said plurality of converter bores of said converter hub, wherein a bottom surface of said base sits flush against said top surface of said plurality of raised knuckles, wherein said projection hole extends centrally through said base disc and said extension disc, wherein said projection hole is sized to contain said central projection therein, and wherein a plurality of lugs of said extension disc match a lug pattern of a closed disc wheel.

2. The system of claim 1, further comprising a plurality of attachment elements, wherein said plurality of attachment elements extend through said plurality of apertures and said plurality of converter bores.

3. The system of claim 2, further comprising an internal threaded section within said plurality of converter bores, wherein an external threaded section of said plurality of attachment elements is to mate with said internal threaded section when a rotational force is applied to said plurality of attachment elements.

4. The system of claim 1, further comprising a mobile home axle assembly.

5. The system of claim 4, wherein said inner drum covers brakes of said mobile home axle assembly.

6. The system of claim 4, wherein said central bore of said converter hub fits about a spindle of said mobile home axle assembly.

7. The system of claim 6, wherein said central bore comprises an inner race and an outer race providing a surface for at least two bearings to rotate.

8. The system of claim 7, wherein an axle nut of said spindle secures said converter hub to said mobile home axle assembly.

9. The system of claim 1, wherein said central projection of said outer surface extends past said plurality of raised knuckles of said outer surface.

10. A system for altering a mobile home axle assembly to support closed rim disc wheels comprising, a mobile home axle assembly, a converter hub having an inner drum, outer surface, central bore, and plurality of converter bores, wherein a spindle of said mobile home axle assembly extends through said central bore from said inner drum to said outer surface, wherein said plurality of converter bores extend from said outer surface to said inner drum through a plurality of raised knuckles of said outer surface, wherein each raised knuckle of said plurality of raised knuckles flat on a top surface has a substantially planar top surface, a converter plate having a base disc, extension disc, projection hole, and plurality of apertures, wherein said plurality of apertures of said converter plate align with said plurality of converter bores of said converter hub, wherein a bottom surface of said base disc sits flush against said top surface of said plurality of raised knuckles, wherein said projection hole extends centrally through said base disc and said extension disc, wherein a plurality of lugs of said extension disc match a lug pattern of a closed disc wheel, and a plurality of attachment elements, wherein said plurality of attachment elements extend through said plurality of apertures and said plurality of converter bores.

11. The system of claim 10, further comprising an internal threaded section within said plurality of converter bores, wherein an external threaded section of said plurality of attachment elements is to mate with said internal threaded section when a rotational force is applied to said plurality of attachment elements.

12. The system of claim 10, wherein said central bore comprises an inner race and an outer race providing a surface for at least two bearings to rotate.

13. The system of claim 10, wherein an axle nut of said spindle secures said converter hub to said mobile home axle assembly.

14. The system of claim 10, wherein said inner drum covers brakes of said mobile home axle assembly.

15. The system of claim 10, wherein a central projection of said outer surface extends past said plurality of raised knuckles of said outer surface.

16. A method for altering a mobile home axle assembly to support closed disc wheels comprising:

obtaining a mobile home axle assembly, obtaining a converter hub to secure to said mobile home axle assembly, obtaining a converter plate to secure to an outer surface of said converter hub, removing a mobile home axle hub from said mobile home axle assembly, securing said converter hub to said mobile home axle assembly in place of said mobile home axle hub, aligning apertures of said converter plate with holes of said converter hub, and securing said converter hub to said converter plate using a plurality of attachment elements.

17. The method of claim 16, further comprising additional steps of:

obtaining a closed disc wheel having a lug pattern, aligning said lug pattern of said closed disc wheel with said lug pattern of said converter plate, and securing said closed disc wheel to said converter plate.

18. The method of claim 16, further comprising additional steps of:

packing an inner bearing and an outer bearing with grease, inserting said inner bearing within a central bore of said converter hub within an inner drum side of said central bore, and inserting said outer bearing within said central bore through a central projection side of said central bore.

19. The method of claim 18, further comprising additional step of:

positioning said central bore about a spindle of said mobile home axle assembly, wherein said converter hub is secured to said spindle using an axle nut.

20. The method of claim 16, wherein an internal threaded section of a plurality of converter bores of said converter plate mate with an external threaded section of said plurality of attachment elements when a rotational force is applied to said plurality of attachment elements.

* * * * *